United States Patent [19]

Bowen

[11] Patent Number: 4,835,896
[45] Date of Patent: Jun. 6, 1989

[54] LAWN CHAIR FISH FIGHTER

[76] Inventor: Paul D. Bowen, P.O. Box 454, Filer, Id. 83328

[21] Appl. No.: 192,186

[22] Filed: May 10, 1988

[51] Int. Cl.$^4$ .................. A01K 97/10; A47B 96/06; A47C 7/62; F16M 13/02
[52] U.S. Cl. .................... 43/21.2; 248/214; 248/517; 297/188; 297/217
[58] Field of Search ............... 43/21.2; 248/214, 215, 248/517, 534, 536, 541; 297/188, 217

[56] References Cited

U.S. PATENT DOCUMENTS

| | | | |
|---|---|---|---|
| 1,566,982 | 12/1925 | Shee | 248/214 |
| 2,055,842 | 9/1936 | Haislip | 248/517 |
| 2,909,215 | 10/1959 | Mitchell | 43/21.2 |
| 3,077,327 | 2/1963 | Batie et al. | 297/217 |
| 3,372,510 | 3/1968 | Arsenault | 43/21.2 |
| 3,773,288 | 11/1973 | Bolton | 248/214 |
| 4,063,701 | 12/1977 | Wray | 297/188 |
| 4,372,072 | 2/1983 | Comeau | 43/21.2 |

Primary Examiner—Nicholas P. Godici
Assistant Examiner—William Scott Andes
Attorney, Agent, or Firm—Frank J. Dykas

[57] ABSTRACT

A lawn chair fish fighter 10 for use with a typical aluminum framed folding lawn chair 1 has an elongated hollow member 11 having a half cylindrical segment 15 attached at its fore end which further has a longitudinally disposed reel notch 16 therein. Attached to the aft end of elongated hollow member 11 is butt plate support member 14 which extends radially outward therefrom and has butt plate 13 attached thereto. A chair hook 12 is attached to elongated hollow member 11 slightly aft of center of gravity C. Lawn chair fish fighter 10 holds a fishing rod and reel 2 in a slightly inclined fishing position and further can be pivoted upwardly for the purpose of fighting a fish.

6 Claims, 3 Drawing Sheets

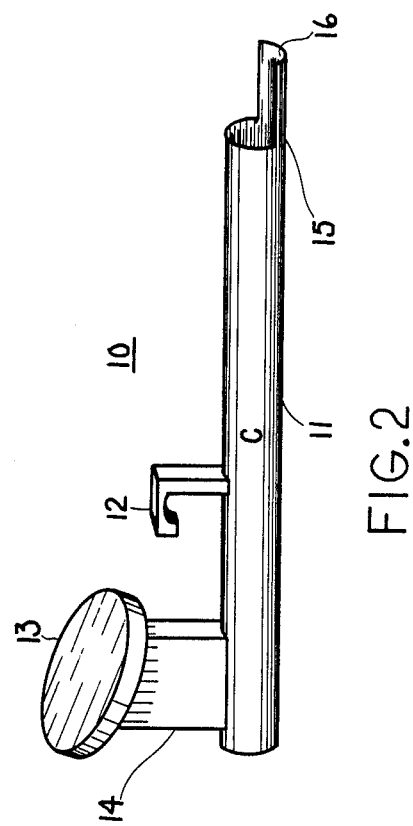

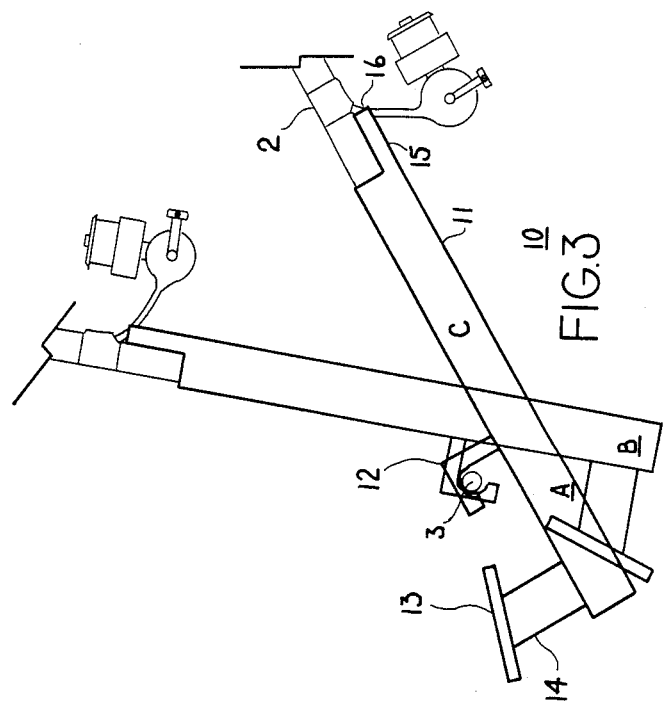

LAWN CHAIR FISH FIGHTER

BACKGROUND OF THE INVENTION

1. Technical Field.

This invention generally relates to apparatus for holding a fishing rod and reel in combination with a fighting chair. In particular this invention relates to an apparatus for converting a typical lawn chair into a fish fighting chair.

2. Background Art.

Due to the relative popularity of sport fishing, many devices exist for receiving and holding the handle of a fishing rod. Additionally, several devices exist wherein the fishing rod handle is supported within a pivotally mounted holder in conjunction with a fighting chair. These particular devices are especially prevalent in deep sea fishing applications. The basic premise behind these devices is that the fishing rod can be maintained in the holder while setting the hook in the fish's mouth and further reeling the fish in. One such device is taught by ARROW, U.S. Pat. No. 4,682,438. ARROW teaches a fighting chair including a pivotally attached rod holder. The fighting chair is collapsible and attaches to the gunwale of a boat. While well suited to boat applications, such as deep sea fishing, this fighting chair will not work for bank fishing. Further, to modify the fighting chair as taugth by ARROW to make it usable for bank fishing, would provide for an expensive and cumbersome apparatus which would not meet the needs of the bank fisherman.

An alternative solution is taught by KNIGHT, U.S. Pat. No. 3,159,366. KNIGHT teaches a cylindrical fishing rod holder which is connected to a base by a standard hinge. In use, the holder is secured to a typical chair by the weight of the fisherman. The fisherman simply inserts the base between his legs and sits on it. A problem with this device is that it is incapable of supporting a fishing rod when left unattended. One of the primary functions of any fishing rod holder is to support, in a fishing position, an unattended fishing pole. The fishing rod holder as taugth by KNIGHT only serves to provide a pivotal support for the handle of a fishing rod, and is best suited for use with a chair having a rigid seat.

What is needed is a lightweight and portable fish fighting chair which is capable of supporting an unattended fishing pole in a fishing position which is both simple to operate and inexpensive to purchase.

DISCLOSURE OF INVENTION

These objects are accomplished by pivotal attachment of my present fishing rod holder to the front crossbar on a typical aluminum folding lawn chair. An elongated hollow member is strategically suspended via an attached hook. The elongated member has one end adapted to removably receive the handle of a fishing rod and additonally has a longitudinal slot to receive the base support member of the fishing reel attached to the fishing rod. The elongated hollow member further has a butt plate support attached to its other end. The butt plate serves to bias the elongated hollow member in a slightly upward inclined position. The positioning of the elongated hollow member in this fashion provides means for sustaining an unattended fishing pole in the proper fishing position. The strategic placement of the attached lawn chair hook is accomplished by locating the hook slightly aft of the longitudinal center of gravity. This causes an upward moment of force on the butt plate end of the elongated hollow member about the fulcrum point created by the attached hook. This upward moment forces the butt plate to rest against the underside of the woven seat of the attached lawn chair.

BRIEF DESCRIPTION OF THE DRAWINGS

FIG. 2 is a perspective representational view of my lawn chair fish fighter.

FIG. 3A is a side view of my new lawn chair fish fighter attached to a crossbar and disposed in the fishing position.

FIG. 3B is a transposed phantom side view of my new lawn chair fish fighter in the fighting position.

BEST MODE FOR CARRYING OUT INVENTION

Figure 1:
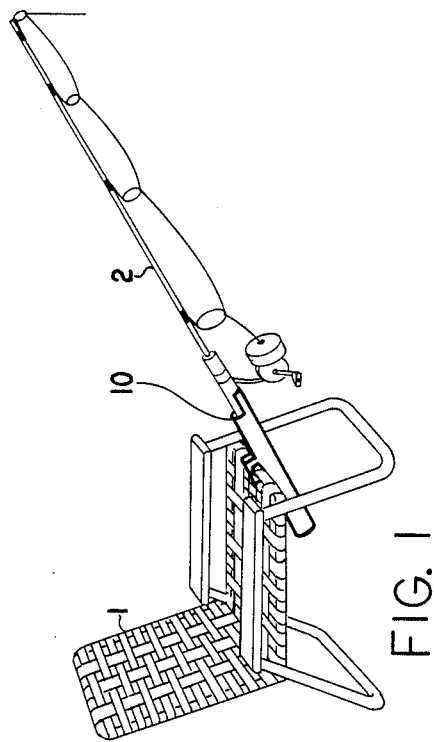
FIG. 1 is a perspective representational view of my lawn chair fish fighter holding a fishing rod and reel.

A lightweight portable fish fighting chair for use in bank fishing, is shown in FIG. 1, and has folding aluminum framed lawn chair 1 with my new lawn chair fish fighter 10 pivotally attached thereto. Fish fighter 10 is shown holding an unattended fishing rod and reel 2 in an inclined position for fishing. Referring now to FIG. 2, a lawn chair fish fighter 10 may be constructed using an elongated hollow member 11. Elongated hollow member 11 has an inverted J-shaped chair hook 12 attached and extending radially outward therefrom. Chair hook 12 is strategically located aft of the center of gravity C. Butt plate 13 is attached to the aft end of elongated hollow member 11, via a butt plate support member 14 which extends radially outward from elongated hollow member 11 in a similar direction as that of chair hook 12. The fore end of elongated hollow member 11, in the preferred embodiment has half cylindrical segment 15 extending longitudinally outward therefrom which further has longitudinally disposed reel notch 16 located at its front end. The fore end of elongated hollow member 11 necessarily has a large enough cross-section to removably receive the handle of fishing rod 2. When fishing rod and reel 2 are engaged in hollow member 11, the reel notch 16 receives the reel base support member located on a typical fishing reel.

Referring now to FIG. 3, my new lawn chair fish fighter 10 is shown pivotally attached to a front crossbar 3 which defines the front of the seat on a typical folding lawn chair. The strategic placement of chair hook 12 aft of the center of gravity C, produces a clockwise force moment which tends to force butt plate 13 up against the bottom of the woven lawn chair seat which is not shown. The relative positions as shown in FIGS. 3A and 3B depict the fish fighting action of my new lawn chair fish fighter 10. During the waiting process, the fish fighter 10, and consequently fishing rod and reel 2, can be maintained in a slightly inclined position and left unattended if so desired. When a fish strikes the fisherman's bait, the fisherman has simply to pull upward on lawn chair fish fighter 10 or fishing rod and reel 2 to set the fishing hook into the fish's mouth. The ensuring fight can be accomplished while supporting the fishing rod and reel 2 in lawn chair fish fighter 10, or alternatively, the fisherman can easily remove fishing rod and reel 2 from lawn chair fish fighter 10 at any time during the fishing process.

While there is shown and described the present preferred embodiment of the invention, it is to be distinctly understood that this invention is not limited thereto but may be variously embodied to practice within the scope of the following claims.

I claim:

1. An apparatus for pivotally attaching a fishing rod and reel to a folding lawn chair comprising:
   an elongated hollow member having a first end being of large enough cross sectional area to receive the handle of a fishing rod;
   an inverted J-shaped chair hook attached to said elongated hollow member at a point aft of the center of gravity, for pivotally engaging the front cross bar of the seat of a folding lawn chair;
   means for biasing said elongated hollow member at an upward incline for holding a fishing rod at an upward incline.

2. The apparatus of claim No. 1 wherein
   said first end further having a longitudinal slot for engaging a fishing reel base support member.

3. The apparatus of claim No. 2 wherein the biasing means further comprises:
   a butt plate support member attached to and extending radially outward from said elongated hollow member;
   a butt plate perpendicularly attached to said butt plate support member, for butting up against the underside of a seat on a folding lawn chair and biasing said elongated hollow member in an uphill inclined position.

4. The apparatus of claim No. 1 wherein the biasing means further comprises:
   a butt plate support member attached to and extending radially outward from said elongated hollow member;
   a butt plate perpendicularly attached to said butt plate support member, for butting up against the underside of a seat on a folding lawn chair and biasing said elongated hollow member in a uphill inclined position.

5. An apparatus for pivotally attaching a fishing rod and reel to a folding lawn chair comprising:
   an elongated hollow member having a first end being of large enough cross-sectional area to receive the handle of a fishing rod, said first end further having a longitudinal slot for engaging a fishing reel base support member;
   a butt plate support member attached to and extending radially outward from, said elongated hollow member;
   a butt plate perpendicularly attached to said butt plate support member, for butting up against the underside of the seat on a folding lawn chair and biasing said elongated hollow member in an uphill inclined position;
   an inverted J-shaped chair hook attached to said elongated hollow member at a point aft of the center of gravity and extending radially outward therefrom in a similar direction as that of said butt plate support member, said hook being used for pivotally engaging the front crossbar of the seat of a folding lawn chair.

6. A portable fish fighting chair comprising:
   a portable folding lawn chair having a front crossbar defining the front of the lawn chair seat;
   an inverted J-shaped chair hook removably and pivotally attached to said crossbar;
   an elongated hollow member attached to said hook at a point aft of the center of gravity and disposed in perpendicular spaced relation to said crossbar, said elongated hollow member having a first end being of large enough cross-sectional area to receive the handle of a fishing rod and further having a longitudinal slot for engaging a fishing reel base support member;
   a butt plate support member attached to said elongated hollow member and further extending radially outward therefrom in a similar direction as that of said hook member.

* * * * *